United States Patent
Krishan et al.

(10) Patent No.: US 6,442,529 B1
(45) Date of Patent: Aug. 27, 2002

(54) METHODS AND APPARATUS FOR DELIVERING TARGETED INFORMATION AND ADVERTISING OVER THE INTERNET

(75) Inventors: Baldev Krishan, Fremont; Leo Chien Chang, Santa Clara; Ronald G. Lambert, Milpitas, all of CA (US)

(73) Assignee: Novaweb Technologies, Inc., Fremont, CA (US)

( * ) Notice: Subject to any disclaimer, the term of this patent is extended or adjusted under 35 U.S.C. 154(b) by 0 days.

(21) Appl. No.: 09/364,622

(22) Filed: Jul. 29, 1999

Related U.S. Application Data

(63) Continuation-in-part of application No. 09/345,401, filed on Jul. 1, 1999.
(60) Provisional application No. 60/108,803, filed on Nov. 17, 1998.

(51) Int. Cl.$^7$ .............................................. G06F 17/60
(52) U.S. Cl. ............................ 705/14; 705/32; 705/400
(58) Field of Search ............................. 705/14, 32, 400

(56) References Cited

U.S. PATENT DOCUMENTS

| | | | |
|---|---|---|---|
| 5,305,195 A | 4/1994 | Murphy | 364/401 |
| 5,355,365 A | 10/1994 | Bhat et al. | 370/85.13 |
| 5,515,270 A | 5/1996 | Weinblatt | 364/405 |

(List continued on next page.)

FOREIGN PATENT DOCUMENTS

| | | | | |
|---|---|---|---|---|
| JP | 409083678 A | * | 3/1997 | H04M/15/00 |
| WO | WO 98/32082 | * | 7/1998 | G06F/17/30 |
| WO | WO 99/21076 | | 4/1999 | G06F/3/00 |

OTHER PUBLICATIONS

Simon Debartol, "Microsoft to Offer Free Internet to 32 Million Michigan Households", Indianapolis Star and News, Dec. 02, 1997.*

"Invest Holdings Group, Inc. Announces Importance Product Maximus", PR News Wire, May 5, 1998p0505ATTU019.*

"NewEdge Corporation Announces . . . to Extend Market Leadership", Business Wire, pp. 2261227, Feb. 26, 1997.*

Wong, William, "Vendor Internet Strategies", Network VAR, v 4, n3, pp. 35(5), Mar. 1996.*

"Cybergold launched a service that pays consumers to look at their WWW advertisements", Information Week, n587, pp. 37+, Jul. 8, 1996.*

"Netgravity Media Lab: . . . ", Business Editors and Computer Writers, Jan. 23, 1997.*

WebRam M3 Product Data Sheet, Ramp Networks, Inc., Sep. 1997.

*Primary Examiner*—Vincent Millin
*Assistant Examiner*—Jagdish N Patel
(74) *Attorney, Agent, or Firm*—Fish & Neave; Nicola A. Pisano

(57) ABSTRACT

Apparatus and methods are provided for subsidizing Internet access through advertising using a "portal provider" that supplies a "mini-portal" to the users of selected Internet service providers (ISPs). The mini-portal includes communications hardware, for connecting to the Internet, and display software, for displaying advertisements or other messages from local non-volatile storage during idle time, such as when the user's computer is connecting to the Internet. Advertisers are sold access to display their advertisements through the display software, and the revenue thus generated may be used to subsidize providing the mini-portal and Internet access fees. A validation mechanism is provided wherein a validation server operated by the portal provider sends data to the mini-portal that helps keep the advertisements current, and gives the portal provider an ongoing role in providing advertisements to mini-portal users.

40 Claims, 6 Drawing Sheets

U.S. PATENT DOCUMENTS

| | | | |
|---|---|---|---|
| 5,572,643 A | 11/1996 | Judson | 395/793 |
| 5,721,827 A | 2/1998 | Logan et al. | 395/200.47 |
| 5,724,356 A | 3/1998 | Nair et al. | 370/401 |
| 5,724,521 A | 3/1998 | Dedrick | 395/226 |
| 5,737,619 A | 4/1998 | Judson | 395/761 |
| 5,740,549 A | 4/1998 | Reilly et al. | 705/14 |
| 5,752,238 A * | 5/1998 | Dedrick | 705/14 |
| 5,781,894 A | 7/1998 | Petrecca et al. | 705/14 |
| 5,823,879 A * | 10/1998 | Goldberg et al. | 463/42 |
| 5,825,883 A * | 10/1998 | Archibald et al. | 380/25 |
| 5,828,837 A * | 10/1998 | Eikeland | 709/202 |
| 5,854,897 A | 12/1998 | Radziewicz et al. | 395/200.54 |
| 5,925,127 A * | 7/1999 | Ahmad | 713/200 |
| 5,933,811 A | 8/1999 | Angles et al. | 705/14 |
| 5,949,474 A * | 9/1999 | Gerszberg et al. | 348/14 |
| 5,974,398 A | 10/1999 | Hanson et al. | 705/14 |
| 5,979,757 A * | 11/1999 | Tracy et al. | 235/383 |
| 5,987,424 A * | 11/1999 | Nakamura | 705/14 |
| 5,996,007 A * | 11/1999 | Klug et al. | 709/218 |
| 6,011,537 A * | 1/2000 | Slotznick | 345/115 |

* cited by examiner

METHODS AND APPARATUS FOR DELIVERING TARGETED INFORMATION AND ADVERTISING OVER THE INTERNET

REFERENCE TO RELATED APPLICATIONS

The present application is a continuation-in-part of U.S. patent application Ser. No. 09/345,401, filed Jul. 1, 1999, which claims the benefit of the filing date of U.S. provisional patent application Serial No. 60/108,803, filed Nov. 17, 1998.

FIELD OF THE INVENTION

The present invention relates generally to methods and apparatus for delivering personalized advertising and information content to Internet users. More specifically, the present invention provides apparatus and methods for delivering and displaying advertising over the Internet, and for providing subsidized network hardware and Internet connections.

BACKGROUND OF THE INVENTION

Worldwide use of the Internet is growing at an extremely rapid pace. Millions of people worldwide use the Internet daily for accessing information, shopping, recreation, receiving product updates, and other communications. As computers and Internet access become less expensive and easier to use, use of the Internet will become even more widespread. Additionally, many hand-held devices, such as hand-held personal computers, personal digital assistants (PDAs), and even cellular phones are now able to access the Internet. It is expected that the availability of devices such as "Internet appliances," that permit households to access the Internet without using a home computer, will even further increase Internet usage over the next few years.

Many companies view the Internet as a profitable place to advertise their goods and services. Many web sites, especially "portal" sites that provide a starting point for browsing the web, are supported by selling advertising space on their web pages. The advertisements typically appear at the top or bottom of a web page, and are referred to as banner ads. Banner ads may be animated, and typically include a hypertext link that takes the user to the sponsor's web page when the user clicks on the banner ad.

At present, portal sites may charge anywhere from $25 to $60 or more per thousand times they display a sponsor's banner ad. Additionally, many portal sites on the web receive payment (up to several dollars) each time a user clicks on a sponsor's banner ad to go to the sponsor's web site. Many portal sites even receive a percentage of any transaction that results from a user transferring from the portal site to a commerce site. Selling banner ad space has proven extremely profitable for many portal sites.

There are many web sites that offer users "free" services in return for being able to display banner ads on the user's screen. These services include e-mail service, calendar and scheduling services, web space (typically, the user's web pages must display banner ads provided by the service), and other Internet services. Some companies have even offered free access to the Internet, or free computer systems in return for the right to display advertisements on the user's screen. The ability to display commercial messages on a user's computer screen is therefore recognized in the Internet community as a valuable commodity.

At present, this trend of offering advertising-supported Internet services, or even "free" hardware in return for displaying advertisements is offered by only a few companies. It requires considerable resources for an Internet service provider (ISP) to offer such marketing programs, since these programs involve providing hardware and custom software to ensure that the ads are displayed. Small ISPs do not have the resources to offer such hardware and software packages, and may have a difficult time finding enough advertisers to support large scale "giveaway" programs. Further, small ISPs may have difficulty establishing, maintaining, and managing relationships with multiple advertisers.

This places smaller ISPs at a considerable disadvantage compared to larger ISPs, such as AT&T Worldnet, America Online, or Microsoft Network, since without being able to offer advertiser-supported hardware packages, they are unable to offer their users complete Internet solutions. Without providing custom software, small ISPs are unable to gain access to their user's desktops, and are unable to display advertisements and other information unless a user voluntarily accesses the ISP's web site. This prevents small ISPs from tapping into a considerable source of revenue. As a result, small ISPs are struggling, while portal sites on the web are thriving, and large ISPs, such as America On-Line, which have custom software allowing them to control a user's web-browsing experience are highly profitable.

Even if small ISPs were able to display banner ads on the screens of their users, the effectiveness of typical banner ads is questionable. Additionally, many users object to typical banner ads because the ads often provide no useful information (i.e. they are poorly targeted), and typically interfere with Internet use by slowing down the display of other, more useful content.

One problem with banner ads is that they may become less effective as the web pages on which they are displayed become more visually interesting. Since banner ads are typically displayed at the same time as the web page on which they appear, the web page may draw the user's attention away from the banner ad. Some web sites have attempted to solve this problem by placing banner ads in special pop-up windows that obscure the web page in which the user is interested, and will not go away until the user takes action to close the window. While this may get the user's attention, it may not have the intended effect. Many forced attention grabbing techniques of this sort have been met with hostility by users.

Another problem with current banner ads is that they may contain large amounts of data in the form of graphics and animation. For a banner ad to draw a user's attention, these animations and graphics are often necessary. Unfortunately, since banner ads are typically downloaded from a server at the same time as other web page content, downloading the banner ads takes bandwidth away from downloading other web content. It can take as long or longer to download the banner ads associated with a web page as it takes to download all of the other content of the page. This problem can become particularly acute when the user is accessing the Internet using a relatively low bandwidth connection, such as a telephone modem.

Currently, most home users of the Internet use a telephone modem to connect to the Internet. Such users may spend a considerable amount of time waiting for their computer systems to connect to the Internet. Additionally, while browsing the Internet, there are often long delay times while servers respond to requests. Further, overuse of the Internet during peak hours, and use of relatively low bandwidth communications channels often cause lengthy communications delays. As the Internet becomes ever more crowded, it is expected that communications delays will become longer and more common, users will have to wait longer for Internet servers to respond, and the amount of idle time during Internet browsing will increase.

At present, this idle time is typically wasted, with the user staring at a blank browser window or old web page content while the system connects to the Internet or waits for a server to respond. Users would probably not mind having material displayed during such idle time to divert their attention while waiting for web page content to be downloaded.

In view of the above, it would be desirable to provide methods that permit ISPs to offer complete Internet solutions without becoming hardware vendors.

It would further be desirable to provide methods and apparatus that permit ISPs to provide advertising and informational content directly to their user's desktops.

It would also be desirable to provide methods and apparatus for displaying advertising and information on a user's screen that uses idle time to download and display advertisements and other informational messages.

SUMMARY OF THE INVENTION

It is an object of the present invention to provide methods that permit ISPs to offer complete Internet solutions without becoming hardware vendors.

It is a further object of the present invention to provide methods and apparatus that permit ISPs to provide advertising and informational content directly to their user's desktops.

It is also an object of the invention to provide methods and apparatus for displaying advertising and information on a user's screen that uses idle time to download and display advertisements and other informational messages.

These and other objects of the present invention are accomplished by providing apparatus and methods that permit Internet access to be subsidized through advertising. The system of the present invention involves a "portal provider", which provides users with a "mini-portal" device. The mini-portal device comprises a communication device, such as a modem, through which the user may connect to the Internet, coupled with display software.

The display software displays advertisements and other messages during selected idle times, when the user is likely to be paying attention to the display, but is not engaged in activity that will be disturbed by the display of advertisements. These idle times may include a period of time when the communication device is connecting to the Internet, when the user is waiting for a predetermined period of time for a response from a server, and when the user's browsing activity has been idle for a predetermined length of time. Additionally, the display software downloads the advertisements and other messages only at times when the user's other activities will not be affected by downloading the messages, such as when the user's Internet connection is idle, or when the user's computer has been idle for a predetermined period of time. Advertisements and other messages are stored on the user's computer, so they need not be downloaded to be displayed.

An ISP that wishes to provide its users with a complete Internet solution at a subsidized price may enter into arrangements with the portal provider to provide the users with mini-portal devices, and to send advertising material to the users, for display using the display software of the mini-portal device. Access to the users may then be sold to advertisers, who will provide the advertising material that is to be displayed. Revenue gained by selling access to the users to advertisers may be used to subsidize providing the users with the mini-portal device, and to subsidize Internet connection fees.

The display software and mini-portal include a validation procedure, wherein the mini-portal devices contact a validation server operated by the portal provider to receive a validation stamp, and a pointer to an advertisement server, from which advertisements (or pointers to advertisements) may be obtained. The validation stamp may have a fixed duration, after which the mini-portal must again contact the validation server to receive a new validation stamp, and a new pointer to an advertisement server. This validation mechanism optionally gives the portal provider an ongoing role in providing advertisements to the users, and in targeting advertisements.

When a mini-portal contacts the advertisement server, the advertisement server may provide the mini-portal with pointers to content servers, which provide the actual content of the advertisements, and a set of parameters that may specify an expiration time for the advertisements, a frequency with which advertisements are to be shown, or a number of times an advertisement should be shown before the advertisement expires. Additionally, the parameters may set the idle times for the display software.

Additionally, the advertisement server may collect statistics from a mini-portal, such as the number of times any given advertisement has been displayed, or the total number of times the display software has displayed messages on the screen. This data may be used to determine how much various advertisers should be charged, to target advertisements, or to assist in determining whether a user has disabled the display software. Collection of statistics also may be handled by a separate statistics server.

In a preferred embodiment of the present invention, the communication device that is provided as part of the mini-portal comprises a device that combines the functions of a modem, a network interface card, and a network hub. By providing a mini-portal with all of these capabilities, ISPs may offer their users a complete networking solution, including both Internet access for numerous computers (using a proxy server), and the services of a local area network.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

The present invention provides methods and apparatus that enable Internet service providers (ISPs) to provide complete Internet solutions (hardware and software) to their users, and to display advertisements and other informational and commercial messages on their users' screens at times that users will not find objectionable.

It will be understood that although the Internet is discussed as though it were a single entity, the Internet comprises a myriad of computer networks connected by bridges, routers, etc., and is constantly evolving. As defined herein, the term "Internet" refers not only to the Internet in its present form, but also encompasses changes, additions and future embodiments of the Internet.

Additionally, it will be understood that although the mini-portal of the present invention is described as communicating across the Internet with various servers, all of this communication typically passes through an Internet service provider through which a computer in which the mini-portal is installed is connected to the Internet. For example, although there will be discussion of the mini-portal receiving pointers to advertisements over the Internet from an advertisement server, there may be numerous intermediary computers, including computers controlled by an Internet service provider, that relay the pointers to advertisements from the advertisement server to the mini-portal.

I. Overview of Advertising-Subsidized Internet Access

Figure 1A:
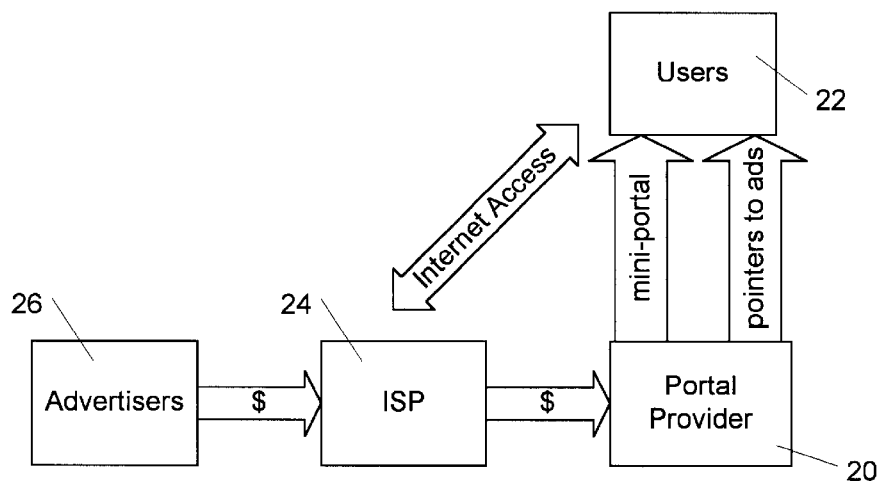
FIGS. 1A and 1B are schematic diagrams illustrating methods of distributing advertising in accordance with the principles of the present invention.
Figure 1B:
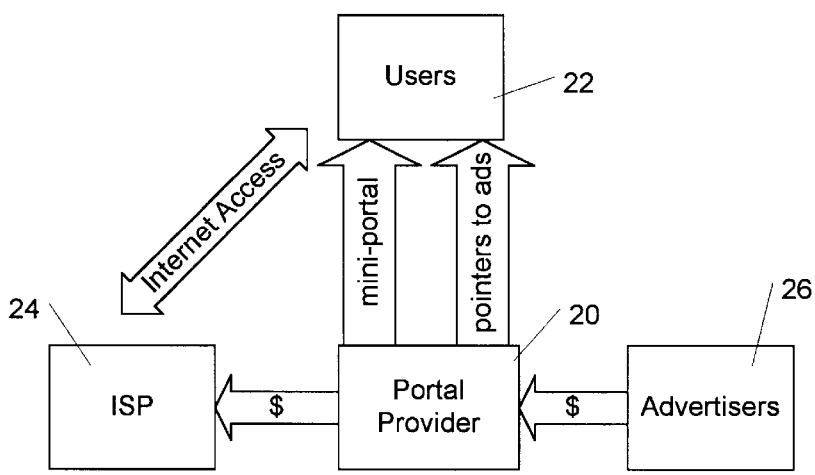

Referring to FIGS. 1A and 1B, two alternative methods of providing Internet advertising in accordance with the present invention are described.

With respect to FIG. 1A a method by which Internet service providers provide advertising or other directed information to their users by buying or leasing a display capability from a "portal provider" is described. Portal provider 20 is a provider of hardware and/or software that permits messages such as advertisements to be displayed on the screen of computer while the computer is establishing a connection to the Internet, and while the Internet connection is idle. The hardware and software combination provided by the portal provider will typically comprise a plug-in card that includes modem circuitry, and a software package that configures an Internet connection, and displays messages. This software may operate as a device driver for the hardware, a proxy server, a part of the operating system, a browser plug-in, or an application program. It will be understood that the portal provider also may provide only the necessary message display software, thereby permitting a user or ISP to supply the hardware. The message display and Internet access product that is (at least partially) provided by the portal provider is referred to hereinafter as a "mini-portal".

Portal provider 20 also provides the "back-end", or server-side operation that pushes the advertisements or other messages to computers running the mini-portal. This may be accomplished by directly providing the advertisements, or, in a preferred embodiment, by providing pointers to advertisements located on numerous advertisement servers, some of which may be administered directly by ISP 24 or advertisers 26. As shown in FIG. 1A, this permits portal provider 20 to send messages to be displayed to users 22 on behalf of ISP 24, or for portal provider 20 to direct mini-portals running on the computers of users 22 to obtain advertising material from a variety of advertisement servers.

Typically, ISP 24 pays portal provider 20 to provide the mini-portal to users 22, and to serve pointers to advertisements specified by ISP 24 to users 22. The amount of payment may be based on the number of ads to be displayed, the number of users to whom an ad is sent, the number of times an ad is displayed (number of impressions), or any other basis on which ISP 24 and portal provider 20 may agree. In addition to monetary payment, ISP 24 may pay portal provider 20 in the form of information about users 22, which may be sold or used by portal provider 20.

Alternatively, portal provider 20 may sell the necessary back-end or server-side software to ISP 24 to permit ISP 24 to directly provide advertisements or pointers to advertisements to users 22. Under this alternative model, portal provider 20 would be paid by ISP 24 for providing mini-portals to users 22, and for selling the server-side software to ISP 24.

Portal provider 20 also may keep an ability to provide pointers to advertisements to users on its own behalf, as well as selling the ability to display advertisements to ISP 24 or advertisers 26. In this way, portal provider 20 may profit by selling access to users 22 directly to advertisers 26, as well as by providing ISP 24 with an ability to sell advertisements. Users 22 would receive some advertisements that are controlled by portal provider 20, and some advertisements that are controlled by ISP 24 or advertisers 26. As will be seen hereinbelow, by using a compound message, ads controlled by portal provider 20 may be displayed simultaneously with ads controlled by ISP 24 or advertisers 26. This provides portal provider 20 with an ability to sell a portion of the space in an ad display to ISP 24.

Users 22 receive mini-portals either directly from portal provider 20, or from ISP 24, and install the mini-portals in their computers. Users 22 are compensated for using the mini-portals and permitting messages to be displayed on their screens in any of several ways. First, as part of an agreement with ISP 24, users 22 may receive the hardware portion of the mini-portal for free, or for a substantially reduced price. Since the hardware portion of the mini-portal may comprise a telephone modem, cable modem, DSL modem, or other communication device in combination with network equipment, such as one or more network interface cards and a network hub, this may represent substantial savings for users 22. Additionally, in return for allowing messages to be displayed through the mini-portal, users 22 may receive free or discounted access to the Internet from ISP 24.

Users who object to receiving advertising material through portal provider 20 may opt out by using a different ISP, or by paying portal provider 20 and/or ISP 24 a higher price for a mini-portal, and by paying a higher fees to ISP 24 for Internet access. The prices charged for a mini-portal, and the Internet access fee may be adjusted according to how often a user is willing to allow the mini-portal to display advertisements on his computer.

ISP 24 provides Internet access to users 22. Additionally, ISP 24 sells advertisers 26 access to the messages that are displayed on the screens of users 22 while users 22 are connecting to the Internet, or during other idle times. Under the model shown in FIG. 1A, ISP 24 provides the messages to be displayed to portal provider 20, which then uses its server-side software to push the advertisements, as well as other messages that ISP 24 wishes to display, to the computers of users 22. Alternatively, as described above, ISP 24 may own the server-side software necessary to distribute the advertisements to users 22.

ISP 24 may charge advertisers 26 according to the size of the ads, the number of users to whom the ads are distributed, the number of times the ads are displayed, or any other method agreed upon by ISP 24 and advertisers 26. Some of these methods may require information from portal provider 20. For example, if the number of times an ad is displayed is the basis on which advertisers 26 pay ISP 24, it is necessary for portal provider 20 to get information from the computers of users 22 on how many times each advertisement has been shown, compile this information, and send this information to ISP 24. This information may be compiled on a statistics server operated by portal provider 20, or ISP 24. If portal provider 20 collects the information, compiling and providing the information may be agreed upon between ISP 24 and portal provider 20, and may require additional payment.

By using portal provider 20 to display messages on the computers of users 22, and selling space in these messages to advertisers 26, ISP 24 is able to offer a complete Internet solution to users 22, including hardware, software, and access, all at a relatively low cost, due to revenues generated by selling ad space. Additionally, ISP 24 is able to tap into the valuable resource of the attention of users 22, permitting ISP 24 to promote its own services, and generate revenue from advertising in a manner similar to portal sites on the Internet.

Referring now to FIG. 1B, an alternative preferred embodiment is shown, in which portal provider 20 generates advertising revenues, some of which are shared with ISP 24, in return for access to users 22 of ISP 24. In this embodiment, portal provider 20 provides mini-portals to users 22, as part of a package offered to users 22 by ISP 24. Portal provider 20 may or may not charge ISP 24 for providing the mini-portals, depending on the arrangement between portal provider 20 and ISP 24.

Portal provider 20 also handles the back-end or server-side of pushing advertisements and other information to the computers of users 22. A server computer controlled by portal provider 20 stores various advertising material, or pointers to advertising material, and sends the material (or the pointers) to the computers of users 22, where the material is displayed by the mini-portals running on the computers. The server computer also may determine how to target ads, and collect information such as how many users have received any given ad, how many times any given ad has been viewed, or any other information that may be useful in targeting ads, billing advertisers, and paying ISPs for access to users.

Portal provider 20 makes arrangements with advertisers 26, whereby advertisers 26 pay portal provider 20 to push their advertisements, or pointers to their advertisements to the mini-portals running on the computers of users 22. Advertisers 26 also may pay portal provider 20 for data collected on users 22 that may permit advertisers 26 to better target their advertisements.

Portal provider 20 also has an arrangement with ISP 24, in which ISP 24 agrees to give portal provider 20 access to its users (i.e. users 22), in return for which portal provider 20 may provide mini-portals to users 22, and may pay ISP 20 for access to the users on an ongoing basis. Additionally, portal provider 20 may receive personal information about users 22 from ISP 24, so that advertisements may be better targeted. Portal provider 20 also may be able to profit by selling this information.

Portal provider 20 may permit ISP 24 to provide messages that will be pushed to the computers of users 22 for display by a mini-portal. ISP 24 may pay for this space, like any other advertiser, or may be given a limited number of messages that it may have displayed as part of the agreement with portal provider 20. Thus, as above, portal provider 20 may sell ISP 24 a portion of the display space for advertisements, while retaining a portion for its own use, or for sale to advertisers 26.

As in the embodiment described with reference to FIG. 1A, users 22 benefit from this arrangement by being provided free or subsidized access to Internet and networking hardware from ISP 24 and/or portal provider 20 in return for running a mini-portal that permits portal provider 20 to display messages on computers. Additionally, users 22 may gain free or reduced cost access to the Internet through ISP 24, which subsidizes its services by receiving advertising revenue through portal provider 20.

Users who object to receiving advertising material through portal provider 20 may opt out by using a different ISP, or by paying portal provider 20 and/or ISP 24 a higher price for a mini-portal, and by paying a higher fees to ISP 24 for Internet access. The prices charged for a mini-portal, and the Internet access fee may be adjusted according to how often a user is willing to allow the mini-portal to display advertisements on his computer.

In this embodiment, ISP 24 is able to offer users 22 a complete Internet access package, including hardware, software, and access, all for a low cost, since ISP 24 receives revenue by providing access to users 22 to portal provider 20. Advantageously, ISP 24 need not establish and maintain relationships with advertisers, and need be only minimally involved in managing the process of providing advertisements to users 22. All of the advertising-related matters are handled by portal provider 20, which is compensated for this extra burden in volume, and by keeping some portion of the advertising revenue for itself. Since portal provider 20 may deal with many ISPs, it may be able to provide advertisers with a very large audience for their advertisements.

Both of these models work best if there is some way of insuring that the basic spirit of the agreement between users 22, ISP 24, advertisers 26, and portal provider 20 is not violated. For example, if users 22 are able to disable the message display capabilities of the mini-portal, then they will not see the advertisements, and should not receive the benefits of discounted hardware, software, and access to the Internet. Thus, portal provider 20 should have a way to prevent users 22 from disabling the display of advertisements, or detecting if users 22 have disabled the display of advertisements. Methods of handling this problem will be described hereinbelow, when the mini-portal is more completely described.

Similarly, if ISP 24, or one or more of advertisers 26 stops paying portal provider 20 for use of the server, the advertisements supplied by the ISP or advertiser should not continue to be displayed and updated. Additionally, if portal provider 20 has paid for providing the mini-portal, then the users 22 of ISP 24 should not continue to reap the benefits of the hardware and software of the mini-portal if ISP 24 is not paying portal provider 20, or otherwise breaches its agreement. Thus, portal provider 20 needs a way of preventing messages belonging to a delinquent ISP or advertiser from being displayed on the computers of users 22, even after the messages have been pushed or downloaded to the computers of users 22. Additionally, portal provider 20 preferably has an ability to disable the mini-portals of users 22 of a delinquent ISP.

These protections are achieved in accordance with the principles of the present invention by using a validation stamp that is periodically sent to the mini-portals running on the computers of users 22 by portal provider 20. In a preferred embodiment, the mini-portal will be activated only upon receiving a validation stamp from portal provider 20, and will continue to function, and to display messages only as long as the validation stamp continues to be renewed.

II. Validation Stamps

Figure 2:
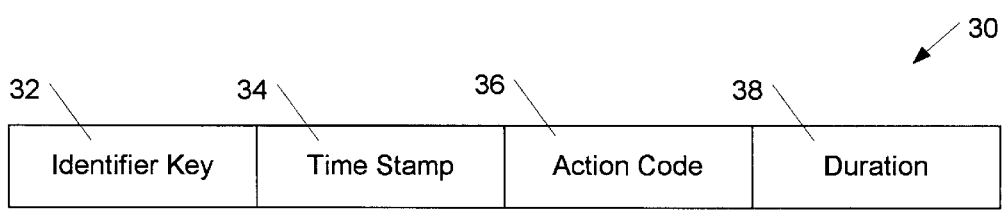
FIG. 2 is a schematic view of the structure of a validation stamp for use in a system built in accordance with the principles of the present invention.

Referring now to FIG. 2 the basic components of a validation stamp used in the system of the present invention are described. Validation stamp 30 comprises identifier key 32, time stamp 34, action code 36, and duration code 38. When portal provider 20 sends validation stamp 30 to a mini-portal, validation stamp 30 may be digitally signed by portal provider 20, by using a standard public-key encryption technique. Validation stamp 30 may be encrypted using a private key associated with portal provider 20 before it is sent. When received by a mini-portal, validation stamp 30 may be decrypted using a public key associated with portal provider 20. This will prevent validation stamps from being easily forged.

Identifier key 32 comprises a unique identifier of the mini-portal to which validation stamp 30 is being sent. This unique identifier may be the serial number of the mini-portal, or may be any other information that uniquely identifies a mini-portal to both the validation server and the mini-portal. This number is used to permit different validation stamps to be sent to different mini-portals, and to insure that validation stamps may only be used on the mini-portal for which they were intended. A mini-portal receiving a validation stamp in which identifier key 32 does not match the mini-portal's unique identifier will ignore the validation stamp.

Time stamp 34 is a time stamp that is applied to validation stamp 30 before it is sent to a mini-portal. Preferably, time stamp 34 comprises the day, month, year, hour, minute, and second that validation stamp 30 was sent. It will be understood that all of this information may be encoded as a single number, and that it may be possible to provide smaller units of time than seconds. Time stamp 34 may be used to set an interval base time for which validation stamp 30 is valid (see below), and to add a degree of security to validation stamp 30.

Action code 36 specifies an action that is to be taken by the mini-portal on receiving the validation stamp. This may be used, for example, to instruct a mini-portal to shut down immediately, removing a user's ability to access the Internet. It also may be used to reactivate a mini-portal, or to cause the mini-portal to take other actions. Among many other possibilities, action code 26 may be used to force a mini-portal to immediately clear and reload its advertisements and messages. This could be useful, for example, for removing advertisements from advertisers who have failed to pay appropriate fees to portal provider 20. Action code 36 is an optional part of validation stamp 30, and may not be needed on some systems, in which validation stamp 30 is used only to verify that advertisements should continue to be shown.

Duration code 38 is used to determine when validation stamp 30 will expire. Typically, when a validation stamp expires, the mini-portal is required to contact a validation server, preferably associated with portal provider 20, to obtain a new validation stamp. The consequences of failing to obtain a new validation stamp may vary. On some systems, lack of a validation stamp will simply cause no messages or advertisements to be displayed. This is useful to prevent the ISPs that have stopped paying portal provider 20 from using the mini-portals to display advertisements to their users. In an extreme case, failure to obtain a validation stamp may cause a mini-portal to stop functioning, effectively denying a user the ability to access the Internet until a new validation stamp is obtained.

Duration code 30 may contain a time at which validation stamp 30 will expire, or a duration, starting from time stamp 34 after which validation stamp 30 will expire. Alternatively, duration code 30 may contain a "special" value, that may affect an ISP's control of the mini-portal. A first of these special values is "never", which indicates that the mini-portal never needs to receive another validation stamp, and will never again contact advertisement servers administrated by ISP 24 or portal provider 20 to receive pointers to new advertisements. This value may be set for users who have decided not to receive ads. Once a mini-portal receives a validation stamp with the "never" duration, it will communicate with a validation server administrated by portal provider 20 only if the user reinitializes the mini-portal.

A second of these special values is the "pending" value. Duration code 28 may be set to "pending" to indicate that the mini-portal should not show any advertisements or messages, but should connect to a validation server managed by portal provider 20 daily (or when the mini-portal is activated, whichever is sooner) to receive new initialization information, and a new validation stamp. This setting may be used to suspend the display of advertisements temporarily, or to assign a user to a different ISP.

A third special value for duration stamp 30 is the "always" value. If duration stamp 30 has this value, the mini-portal will always receive its advertisement pointers and other services from ISP 24, rather than from portal provider 20. This setting is useful when an ISP has purchased the necessary server-side software to handle sending advertisements to the mini-portals on their users' computers. Once this has occurred, there is no need for portal provider 20 to be involved sending messages and advertisements to the users of the ISP. The mini-portal will not require further validation stamps from portal provider 20.

It will be understood by one skilled in the art that validation stamp 30 is for purposes of illustration. The fields of an actual validation stamp may be arranged in any order, and the data contained in the fields of an actual validation stamp may be encoded in a variety of well-known ways. Additionally, it will be understood that there may be other fields or information that may be included in validation stamp 30. Many variations are possible without departing from the system of the present invention.

III. Mini-Portal Database

Providing validation services for the mini-portals requires portal provider 20 to operate a validation server that uses a database containing records for all of the mini-portals to keep track of the ISP that is associated with each mini-portal, and the validation status of each mini-portal. A mini-portal database maintained by portal provider 20 is used for these purposes.

Figure 3:
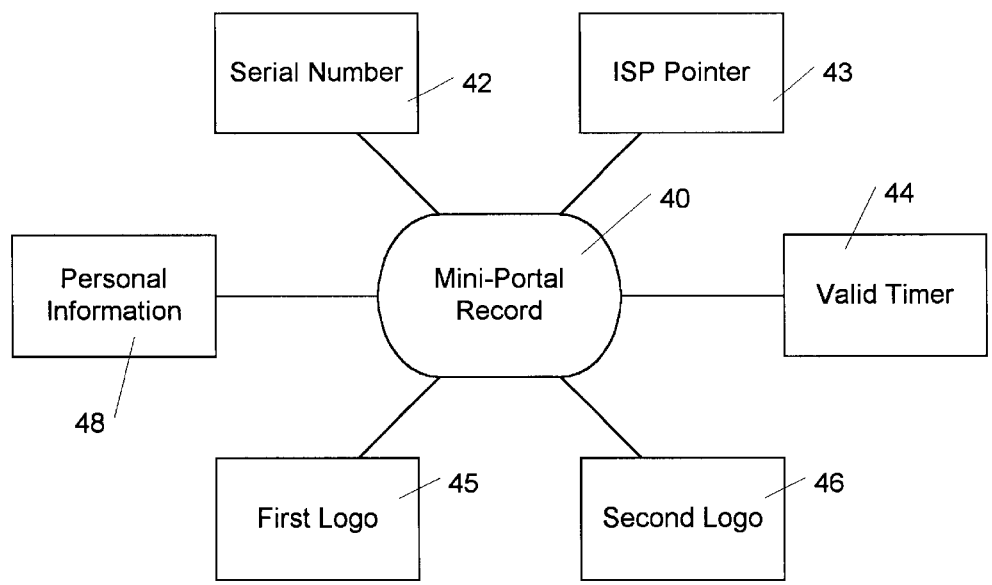
FIG. 3 is a schematic view of the structure of a mini-portal record in the mini-portal database that is used in a preferred embodiment of the present invention.

Referring now to FIG. 3, the structure of a mini-portal record in the mini-portal database kept by portal provider 20 is described. Whenever portal provider 20 receives a new order for a mini-portal from an ISP or user, a mini-portal record such as that shown in FIG. 3 is created. The mini-portal database is typically accessed during initialization and revalidation of a mini-portal. Information in the mini-portal database may be added, changed, and deleted by portal provider 20.

Mini-portal record 40 comprises serial number field 42, ISP pointer field 43, valid timer field 44, first logo pointer field 45, second logo pointer field 46, and personal information field 48. A mini-portal may be validated if the information in serial number field 42, ISP pointer field 43, and valid timer field 44 are filled in.

Serial number field 42 contains a serial number for a mini-portal, or any other information that uniquely identifies a mini-portal. Typically, the manufacturer of the mini-portals, or portal provider 20 will assign a unique serial number to each mini-portal that is shipped.

ISP pointer field 44 identifies the ISP with which the user is associated. This may be a value that points to a record in a separate ISP table or database (not shown), or it may be an ISP-specific uniform resource locator (URL) pointing to an advertisement server where pointers to advertisements may be retrieved by members of the ISP.

Valid timer field 44, which typically contains a value of 30 days, specifies the duration of the initial validation stamp that will be sent to the user. In a preferred embodiment, this field is also used to determine the validation stamp duration when a mini-portal is re-validated after a validation stamp expires. Thus, by changing the contents of valid timer field 44, portal provider 20 may change the duration of any validation stamps that are sent to the mini-portal identified in serial number field 42. For example, when a user switches to a different ISP, ISP pointer field 43 may be cleared, and valid timer field 44 may be set to a value of "pending", until the switch to a new ISP is complete.

First logo field 45 and second logo field 46 contain pointers (typically URLs) to graphical logos that will be displayed with each set of advertisements or messages that is displayed by the mini-portal identified in serial number field 42. Typically, first logo field 45 will point to a logo for the portal provider, and second logo field 46 will point to a logo for an ISP. It should be noted that first logo field 45 and second logo field 46 are optional fields, and the information they contain may be stored in some other manner. For example, these records could be stored in a record in an ISP table or database (not shown) pointed to in ISP pointer field 43.

Personal information field 48 contains personal information on the owner or user of the mini-portal identified in serial number field 42. This field may contain a pointer to a record in a separate user database (not shown), or may directly contain the information. The personal information may include an address, phone number, e-mail address, income level, number of persons in the household, ages of members of the household, interests and hobbies of each of the individuals in the household, and any other information that may be useful in directly targeting advertising material or other information content to the user, or to members of his or her household. In a preferred embodiment, this information is provided by an ISP when the order for the mini-portal is placed. Alternatively, personal information may be obtained during an initial on-line registration process. It should be noted that this information is optional, and personal information field 48 may be omitted if the portal provider prefers not to keep personal information on users.

It will be understood by one skilled in the art that additional fields may be kept on each mini-portal. For example, depending on the database system used to implement the system of the present invention, it may be desirable to have a unique record number field associated with each mini-portal record. Additionally, most of the fields in mini-portal record 40 may either directly contain data, or may point to an entry in another table or database that contains the data. In a preferred embodiment, the mini-portal database is hosted on a database server running MICROSOFT SQL server 7.0, by Microsoft Corporation, of Redmond, Wash.

IV. System Structure

Figure 4:
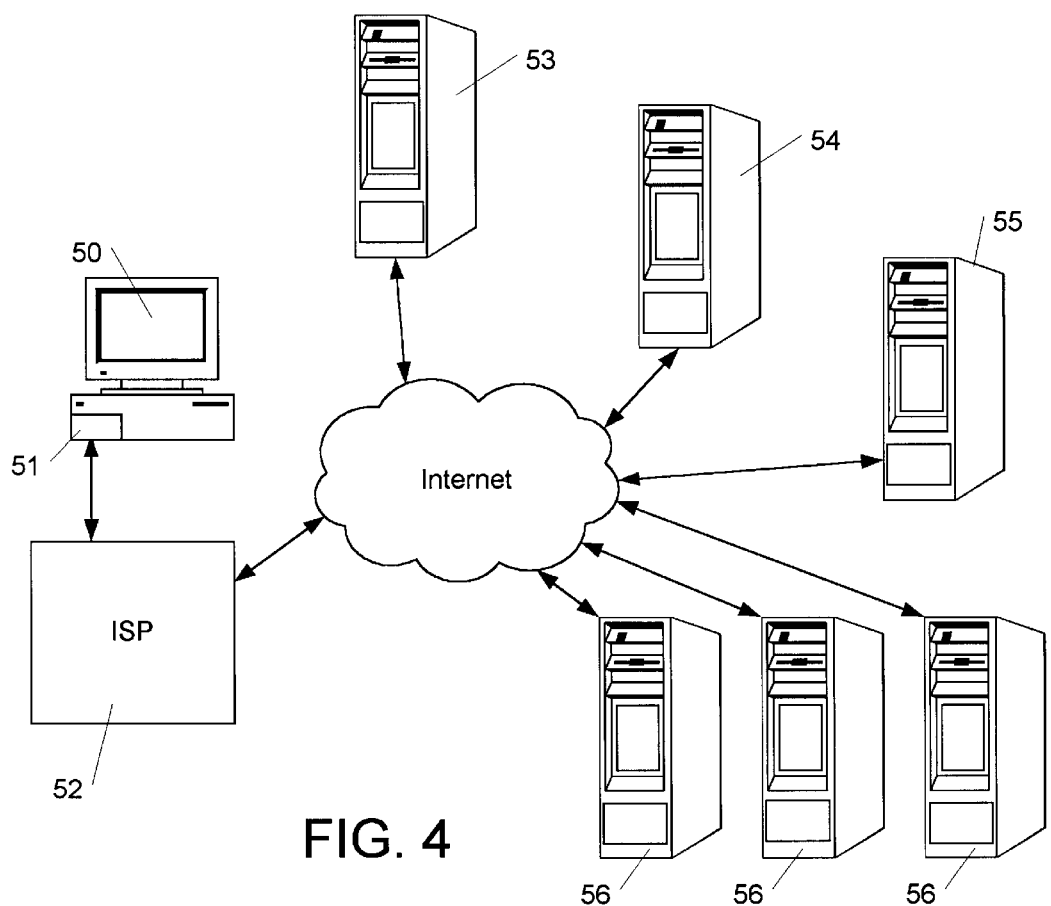
FIG. 4 is a schematic view of a preferred embodiment of a system for delivering and displaying advertisements of the present invention.

Referring to FIG. 4, the overall structure of the system of the preset invention is shown. The system involves personal computer 50 with mini-portal 51, ISP 52, validation server 53, advertisement server 54, statistics server 55, and content servers 56.

Personal computer 50 is located in a user's home or business, and contains mini-portal 51, comprising a hardware portion, that permits personal computer 50 to communicate with the Internet through ISP 52, and a software portion, that displays messages, including advertisements, on the screen of personal computer 50. Mini-portal 51 displays advertisements and other messages only at times when viewing the messages will not unduly burden to the user, such as when personal computer 50 is connecting to the Internet, when personal computer 50 is waiting for a server on the Internet to respond, or when Internet browsing on personal computer 50 has been idle for longer than a predetermined period of time.

Additionally, mini-portal 51 downloads new advertisements and other messages only at times when the downloading will not affect other Internet activity, such as when the Internet connection is idle, when personal computer 50 is idle, or at times scheduled by the user. The messages and advertisements are stored in local storage on personal computer 50, so they may be quickly accessed and displayed. As will be explained below, the process of downloading advertisements and other messages may involve use of advertisement server 54, statistics server 55, and content servers 56.

Validation server 53 is operated by the portal provider, and provides validation stamps and configuration data to mini-portals. As will be explained in detail hereinbelow, when mini-portal 51 is initialized, it contacts validation server 53, sends its serial number or other identifying information, and receives a validation stamp and other configuration information, such as a uniform resource locator (URL) of the advertisement server from which mini-portal 51 will receive pointers to advertisements. Whenever its validation stamp expires, mini-portal 51 must contact validation server 53 to obtain a new validation stamp and configuration information.

Advertisement server 54, which may be operated by the portal provider, by an ISP, or by some other entity, provides pointers to advertisements. When downloading new advertisements or other messages, mini-portal 51 contacts advertisement server 54, which sends one or more "index files" to mini-portal 51. These index files contain pointers to advertisement content, typically in the form of URLs that point to content servers 56. When mini-portal 51 contacts advertisement server 54, it may sent its serial number, or other identifying information, so that advertisements can be more carefully targeted. Alternatively, advertisement server 54 may directly provide the content of the advertisements, in which case content servers 56 are not needed.

Additionally, advertisement server 54 may send various parameters to mini-portal 51. These parameters may include expiration dates for the advertisements or other messages, as well as information on how many times a particular message should be displayed, how frequently messages should be displayed, and how long mini-portal 51 should wait before deciding that a server is taking too long to respond or a browsing session is idle, so that messages may be displayed. The parameters also may include a pointer to a statistics server, typically in the form of a URL.

Statistics server 55, which may be operated by the portal provider, an ISP, or some other entity, collects statistics on mini-portals. These statistics may include information that is useful for charging advertisers, such as how many times each advertisement was displayed. Additionally, data collected by statistics server 55 may be used to determine whether a user is continuing to use mini-portal 51. The data also may be useful for more precisely targeting advertisements to particular users. It should be noted that use of statistics server 55 is optional, and in some systems, where it is not necessary to collect usage data, it may be desirable to omit statistics server 55. Additionally, in some systems, the functions of statistics server 55 may be combined with the functions of advertisement server 54.

Content servers 56, which may be operated by the portal provider, an ISP, advertisers, or other entities, provide the actual content of the advertisements or other messages. When mini-portal 51 downloads advertisements, it uses the index file obtained from advertisement server 54 to locate content servers 56. Mini-portal 51 then downloads the content of advertisements or other messages from content servers 56, and stores the content in local storage on personal computer 50. When mini-portal 51 determines that the messages may be displayed without unduly burdening the user, the advertisements and other messages may be retrieved from local storage, and displayed. Alternatively, the functions of content servers 56 may be performed by advertisement server 54.

It will be understood by one skilled in the art that various minor changes may be made in this overall structure without departing from the invention. For example, validation server 53, advertisement server 54, statistics server 55, and content servers 56 may all execute on a single computer, or may be distributed in a variety of ways over numerous computers, controlled by the portal provider, an ISP, advertisers, or other entities. Additionally, in some systems, mini-portal 51 may communicate with multiple advertisement servers and statistics servers.

V. Mini-Portal Initialization and Validation

Figure 5:
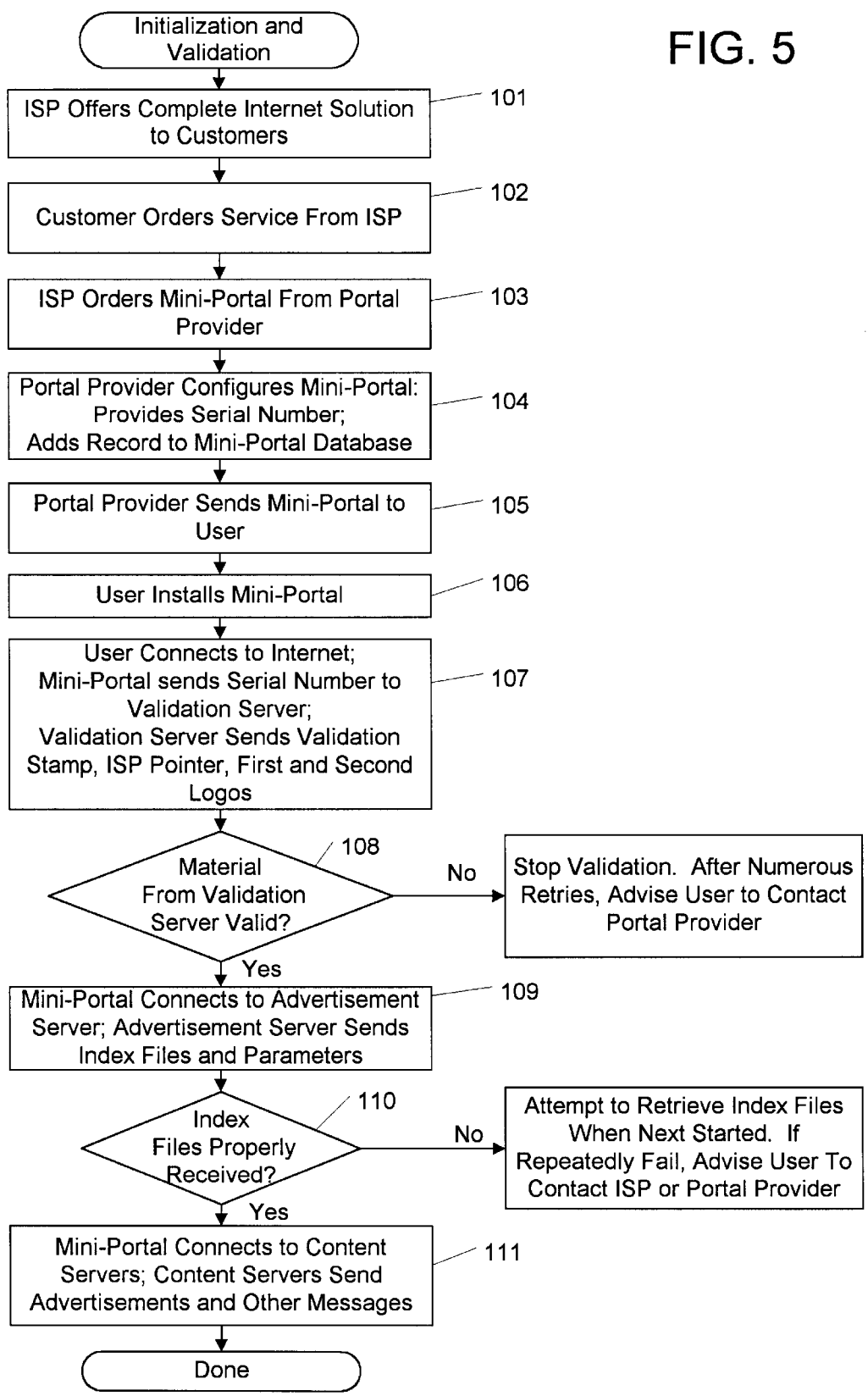
FIG. 5 is a flow chart of mini-portal initialization and validation methods.

Referring now to FIG. 5, an overview of the operation of the system of the present invention during initialization and validation is described. This process includes steps that are performed by the portal provider, by a validation server, by an ISP, by a user, by an advertisement server, and by a mini-portal running on the user's computer. Although these steps may be separated according to the entity that performs them, the overall operation of the system is more clearly illustrated by including the actions taken by all of these entities.

At step 101, an ISP offers a complete Internet solution, including hardware and software to customers. When a customer orders service from the ISP, at step 102, the ISP places an order for a mini-portal with the portal provider, at step 103.

At step 104, the portal provider configures the mini-portal that will be sent to the customer, hereinafter referred to as the "user". This configuration involves setting a unique serial number into the mini-portal, and adding a record to the mini-portal database (described hereinabove) kept by the portal provider.

At step 105, the portal provider ships the mini-portal to the user, and the user installs the mini-portal in his or her personal computer in step 106. Additionally, in step 106, the user connects to the Internet for the first time using the mini-portal, to complete the steps of configuring the mini-portal.

In step 107, when the user connects to the Internet, the mini-portal sends its serial number over the Internet to a validation server operated by the portal provider. This serial number information is used to access the mini-portal database maintained by the portal provider. Based on the information in the mini-portal database, the server sends the mini-portal an ISP pointer that provides the mini-portal with a uniform resource locator (URL) for an advertisement server that provides pointers to the advertisements, messages, or other information associated with the ISP. Additionally, the validation server sends the mini-portal a validation stamp (explained hereinabove), and two graphical logos that are displayed whenever the portal displays advertisements or other information. The first logo identifies the portal provider, and the second logo identifies the ISP. The mini-portal stores the ISP pointer, the validation stamp, and the first and second logos.

At step 108, the mini-portal checks that all of the information received from the server is valid. It also checks the validation stamp to determine whether the user should be permitted to proceed with initialization. If the proper data was not received, or there was some other difficulty, validation stops, and the mini-portal will not operate until the user tries again, and successfully completes the validation procedure. After a predetermined number of retries that end in failure, the user will be advised to contact the portal provider to resolve the difficulties.

At step 109, the mini-portal uses the URL from the ISP pointer to connect over the Internet to an advertisement server, and download one or more "index files", that contain pointers to advertising or other messages associated with the user's ISP. This step may include sending serial number information, or other identifying information so that the information sent to the user may be customized according to a user profile. The URL in the ISP pointer may identify an advertisement server maintained by the ISP, or an advertisement server maintained by the portal provider.

The advertisement server also may send information on how frequently the ads should be displayed, and how much idle time, or time spent waiting for a server to respond should pass before ads are displayed. Other parameters of the mini-portal, as described hereinbelow, also may be sent to the mini-portal by an advertisement server.

At step 110, the mini-portal checks to see if the index files were properly received. If not, the mini-portal will try to receive the index files when it is next started, or during idle time. If this fails a predetermined number of times, the mini-portal will report a problem to the ISP or the portal provider through an automatically generated e-mail message. Additionally, the mini-portal optionally may shut down.

At step 111, the mini-portal connects to content servers to download the advertising identified in the index files, and completes the initialization and validation process. Once initialization and validation is complete, the mini-portal may be used to provide the user with Internet access through an ISP, and to display messages as described hereinbelow.

It will be understood by one skilled in the art that there are many minor modifications that may be made to this procedure. For example, the initialization procedure may include a step during which the user provides various personal information to the portal provider by connecting to a web site provided by the portal provider. Additionally, instead of providing "index files" that point to advertisements or other information, the advertisement server may directly provide the material that will be displayed. While this approach is somewhat less flexible, it may provide a greater degree of control over the advertisements that are displayed.

Steps 107–111 are substantially repeated when the mini-portal is started after the expiration of a validation stamp. When a validation stamp expires, it is necessary for the mini-portal to connect with a validation server maintained by the portal provider to receive a new validation stamp, and new information, such as an ISP pointer and logos.

VI. Mini-Portal Software

Figure 6A:
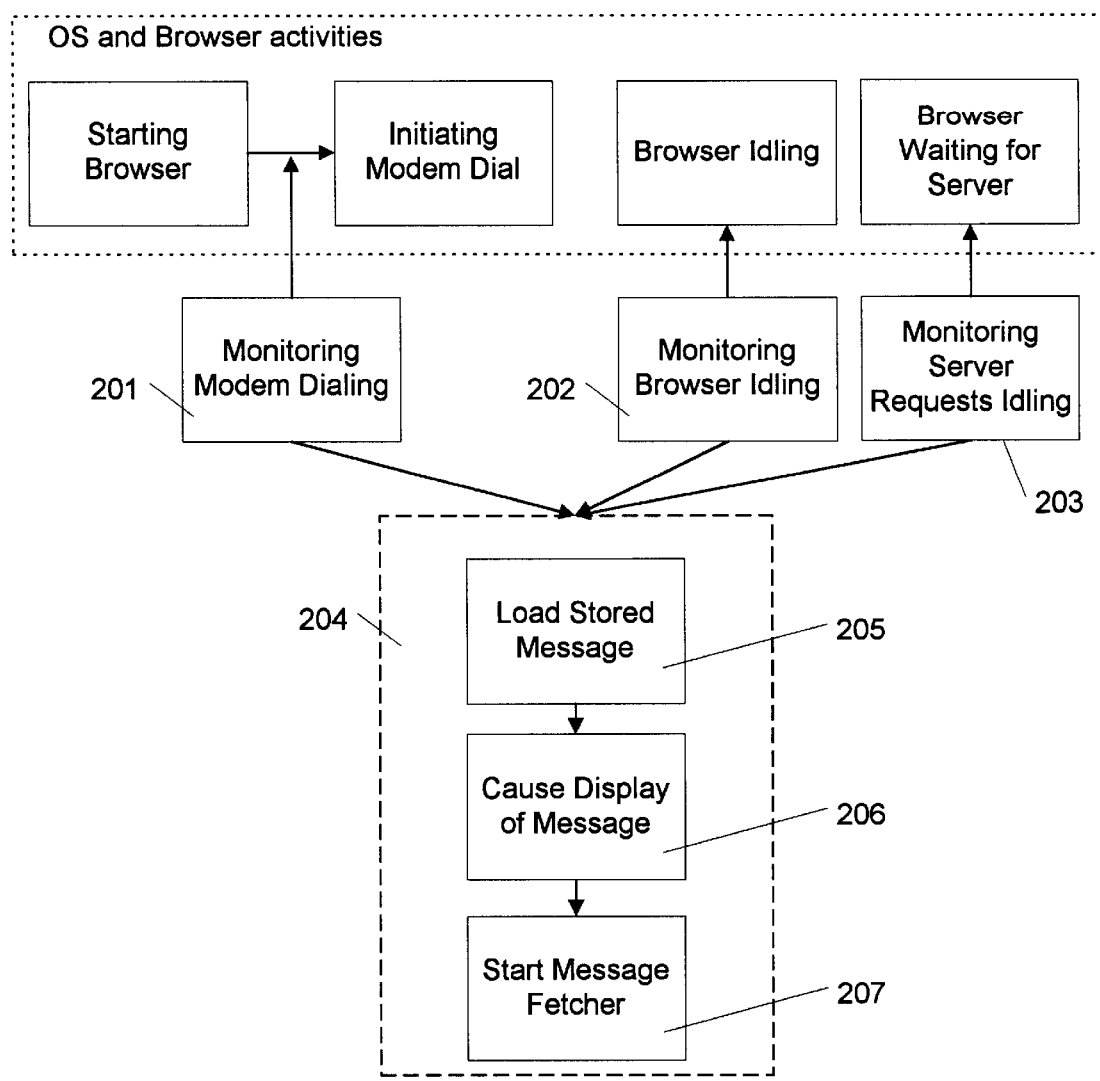
FIG. 6A is a block diagram of the "message poster" portion of the software of a mini-portal of the present invention.
Figure 6B:
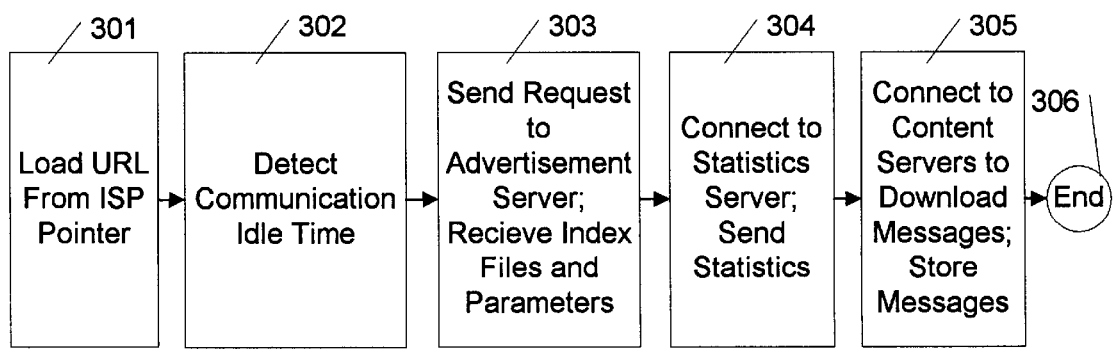
FIG. 6B is a block diagram of the "message fetcher" portion of the software of a mini-portal of the present invention.

Referring now to FIGS. 6A and 6B, operation of a software portion of the mini-portal is described. Before such operation can begin, however, the mini-portal must check to see if its validation stamp has expired. If so, the mini-portal must complete a validation procedure, as described hereinabove, before resuming normal operation.

A preferred embodiment of the mini-portal of the present invention is implemented as software that executes on each user's personal computer as part of a proxy server. Alternatively, the invention may be implemented as software that is part of a modem driver, an operating system, a web browser, or an application program. A proxy server is software that permits a single computer, referred to as the proxy server computer, to share a single connection to the Internet with one or more client computers connected to a local area network (LAN), so that the client computers can access the Internet through the proxy server computer. When executing as part of a proxy server, the mini-portal will execute on the proxy server computer, but monitor the activity of client computers, and cause messages to be displayed on the screens of client computers. It should be noted that the proxy server computer also may be used as a client computer.

In an alternative preferred embodiment, the mini-portal is implemented as part of the driver software for a hardware communication device such as a modem, or the mini-portal card described hereinbelow. Since the mini-portal is part of the driver software, the communication hardware will not function without the mini-portal being present. This will prevent most users from removing the mini-portal software. Alternatively, the mini-portal may be part of a proxy server, while the driver software for the communication device may check to make sure that the mini-portal software is installed, and reactivate the mini-portal software if it is not running, or deactivate the communication device until the mini-portal software is loaded.

The mini-portal software is described as working in conjunction with an Internet browser, such as Netscape Navigator, by Netscape Communications Corporation, of Mountain View, Calif., or Internet Explorer, by Microsoft Corporation, of Redmond, Wash. It will be understood, however, that the mini-portal software could be used with most any Internet application. It will further be understood that the mini-portal software could be implemented on nearly any Internet access device having a processor that executes a web browser program, memory, non-volatile storage, and a means of communicating with the Internet. These Internet access devices includes devices such as set-top boxes, hand-held devices, PDAs, and cellular telephones.

The mini-portal software of the present invention is divided into two main programs: a "message poster," that determines when a computer that is browsing the web is idle, and causes messages to be displayed during idle time; and a "message fetcher," that fetches and updates stored messages from an advertisement server in the background. The message fetcher also may send a variety of statistical information, such as how many times each advertisement has been displayed to the advertisement server, or to a separate statistics server. Each of these programs comprises numerous processes or routines that are stored in memory when the program is executing, and that permit the program to carry out its functions. Additionally, each of these programs may be executed on a proxy server computer that provides access to the Internet to one or more client computers, or on a computer (or other device) that is used for web browsing.

The message poster program is preferably loaded into memory on a user's computer system when the operating system or proxy server software is started, preferably during the boot-up process. The program remains resident in memory during computer operation, and monitors communications. Alternatively, the message poster program may be loaded as a stand-alone application, as part of an Internet browser, or as a browser "plug-in", that executes while the Internet browser software is active.

Referring now to FIG. 6A, a block diagram of the operation of the message poster program is shown. Monitoring processes 201, 202, and 203 monitor Internet activity, and activate the rest of the message poster program when any of a number of events occur. Monitoring process 201 waits for a user to start an Internet browsing program, and activates message display process 204 so that a message is displayed while a dial-up connection to the Internet is being established. Monitoring process 202 activates message display process 204 when it determines that an Internet browsing program has been idling for longer than a preset time. Monitoring process 203 activates message display process 204 when an Internet request is initiated and the server response time exceeds a preset time limit. Such requests are typically made through the use of a Uniform Resource Locator (URL), which identifies the requested web page or information.

If the message poster program is running as part of a proxy server, the message poster program monitors the activity of one or more client computers. In a typical proxy server configuration, the client computers are required to access the Internet through the proxy server, so the proxy server may readily monitor any Internet or web browsing activity of the one or more client computers. Alternatively, if the message poster program is executing as a part of an operating system, part of a web browser, or as an application program on a computer that is used to browse the web, the message poster program monitors the Internet or web browsing activity on the computer on which it executes.

Numerous parameters, such as which monitoring processes should be used or the time limits for use by the monitoring processes, maybe specified. In a preferred embodiment, these parameters are downloaded from an advertising server when the mini-portal is initialized, and whenever a new set of advertisement index files are downloaded. Alternatively, these parameters may be downloaded from the portal provider, preprogrammed in a "preferences" section (not shown) of the message poster program, embedded in an initialization file of the message poster program, or set by the user.

Once message display process 204 is started, several steps are taken. First, at step 205, a message is loaded from non-volatile storage, such as a hard drive, flash memory device, or EEPROM. At step 206, the system causes the message to be displayed on the screen of a computer. As described in greater detail hereinbelow, the message is preferably displayed in a small browser window in front of the main browser window, but other methods of display are possible. For example, "displaying" an advertisement may comprise playing a sound file from the non-volatile storage, or playing any other multimedia content, including sound, video, animation, music, images, text, graphics, hyperlinks, interactive content, or any combination of such elements.

If the message poster program is executing as part of a proxy server, then step 206, in which the system causes the message to be displayed, is performed by sending the message from the proxy server computer to a client computer, and sending commands to cause the client computer to display the message. Alternatively, if the message poster program is executing as part of the operating system, part of a web browser, as device driver software, or as an application program on a computer that is being used to browse the web, then step 206 will typically cause the message to be displayed on the same computer on which the message poster program is executing.

At step 207, the message fetcher program may be started to retrieve and update messages. The message fetcher program is typically executed when the stored messages have been shown a predetermined number of times, or when one or more stored messages have expired. Stored messages may be set to expire on a particular date or after a predetermined length of time. Additionally, the message fetcher program may be executed as part of the initialization process, to retrieve a first set of messages and advertisements from an advertisement server.

The message fetcher program also may be executed at times when the computer system has been idle for a reasonably long period of time (e.g. more than 30 minutes). This typically requires that the computer establish a connection to the Internet specifically for the purpose of executing the message fetcher program. A user also may schedule times that the message fetcher program may be executed. This permits the user to schedule the message fetcher program to run at times when the user's other computer use will not be disrupted by the message fetcher program, such as in the middle of the night.

The message fetcher program should preferably be executed frequently—at least once per day, so that advertisements and other messages do not become outdated. Additionally, frequent execution of the message fetcher program permits statistics, such as the number of times a given advertisement has been displayed, to be kept current.

Advertisement servers or statistics servers also may record the frequency with which a given mini-portal executes the message fetcher, and keep track of the message display statistics to make certain that a user is executing the mini-portal software. If long periods of time pass without a given mini-portal fetching new advertisements, or the mini-portal consistently reports that no advertisements have been displayed, the ISP or portal provider may scrutinize a user more carefully, to make sure that he or she is still using the mini-portal software.

Referring now to FIG. 6B, a block diagram of the message fetcher program is shown. At step 301, the message fetcher loads the ISP pointer URL, which identifies an advertisement server on the Internet from which pointers to the advertisements and other messages are to be retrieved. In a preferred embodiment, this URL is sent to the mini-portal by the portal provider during initialization and validation, and may be changed each time the mini-portal contacts the portal provider to receive a new validation stamp. Alternatively, the URL may be embedded in the code of the message fetcher program, or may be read from an initialization file. Additionally, multiple URLs may be specified, so that pointers to the messages may be retrieved from numerous sources.

In a preferred embodiment, the message fetcher program may choose to retrieve messages when a preset idle time is met (i.e., there is no browsing activity), or when less than a preset fraction of the communication bandwidth to the Internet is being used. Step 302 detects this idle condition, and proceeds to step 303 when the idle condition is met. Thus, advertisements and other messages are downloaded when the download activity will have little or no impact on use of the Internet. Advantageously, this capability permits the message fetcher to "steal" idle time, and avoid data congestion on the Internet connection. This feature is especially useful when a low-speed Internet connection is being used, since the program will not be perceived as burdening the communication speed. By retrieving messages during idle time, the message fetcher increases the efficiency of the communications bandwidth.

The message fetcher program also may fetch advertisements or messages when the computer system has been idle for a predetermined period of time, or at specific times specified by the user. Step 302 should be skipped when the message fetcher program is executed under these conditions.

At step 303, the message fetcher sends a request to an advertisement server, and waits for the advertisement server to send it one or more index files. These index files contain pointers to advertising materials or other messages. In a preferred embodiment, the message fetcher downloads three separate index files: an index file for advertisements that should be shown while the computer is establishing an Internet connection (e.g. dialing); an index file for advertisements that should be shown when the browser is idle; and an index file for advertisements that should be shown while the browser is waiting for a server to respond.

Additionally, the advertisement server may send the mini-portal various parameters when the mini-portal downloads the index files. These parameters may include one or more dates on which the index files should expire, the amount of time that should pass before the browser is considered idle and advertisements should be displayed, the amount of time that should pass before displaying messages when a server is not responding, the location of a statistics server, the frequency with which advertisements should be displayed, and any other parameters used by the mini-portal.

At step 304, the mini-portal connects to a statistics server, and sends the statistics server information on the usage of the mini-portal. This information may include a number of times that each advertisement was displayed, the number of times that a hyperlink in an advertisement was followed, and other data that would be useful in determining how much advertisers should be charged. The collected information also may be used to make sure that the user continues to execute the mini-portal, and to build a profile of the user that may be useful in targeting advertisements. The advertisement server and the statistics server may be the same, in which case all of this statistical information may be sent to the advertisement server while the mini-portal is connected to the advertisement server to download index files.

At step 305, the mini-portal uses the pointers in the index files to retrieve a collection of advertisements and other messages over the Internet from one or more content servers. The newly retrieved messages are stored in the non-volatile local storage, so they may be displayed by the message poster. The newly retrieved messages may overwrite previously stored messages, to prevent memory overflow, and to make it easier for the message poster to find the new or updated messages. Alternatively, the non-volatile storage can be checked to see if a preset storage limit has been reached. If there is space for the newly retrieved messages in the non-volatile storage, the newly retrieved messages are stored. If there is not sufficient space in the non-volatile storage, one or more messages are removed from the non-volatile storage to make space for the newly retrieved messages.

It should be noted that the message fetcher may contact multiple URLs specified in an index file to retrieve messages, and may retrieve multiple messages from each of the URLs. Additionally, as described in greater detail hereinbelow, the advertisements or messages may include compound messages, comprising multiple frames, each of which may contain a message retrieved from a different URL.

Finally, at step 206, the message fetcher terminates its activities, and shuts down. This leaves the message poster program running, so that the new or updated advertisements and other messages retrieved by the message fetcher will be displayed by the message poster.

If the message fetcher program is executing on a proxy server, the non-volatile storage will typically be connected to the proxy server, and client computers may access messages in the non-volatile storage over a local area network. Alternatively, if the message fetcher program is executing as part of an operating system, part of a web browser, as part of a device driver, or as an application on a computer that is used to browse the web, the non-volatile storage will typically be local storage on the computer that is executing the message fetcher program.

Figure 7:
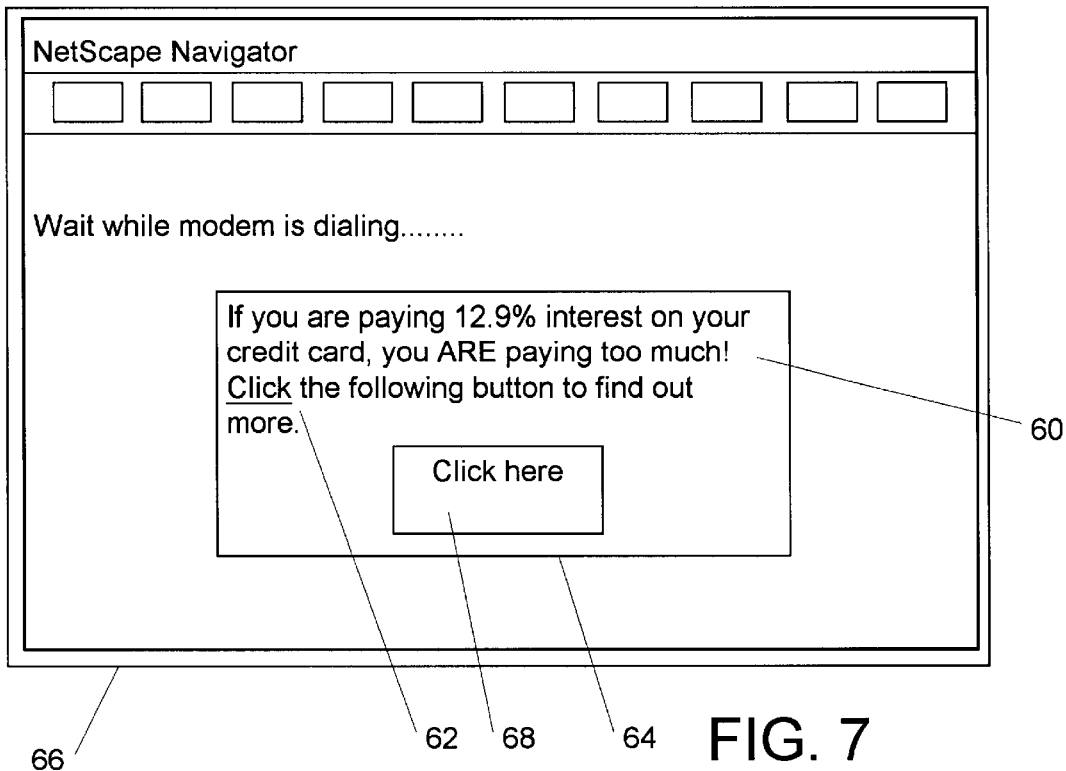
FIG. 7 is a screen display of a sample message window displayed while a computer using a mini-portal is connecting to the Internet.

Referring now to FIG. 7, a sample message window displayed while a connection to the Internet is being established is shown. Message 60, which may contain hypertext links, such as link 62, is displayed in message window 64 in front of main browser window 66. The user may read message 60 while waiting for a the Internet connection to be established.

Figure 8:
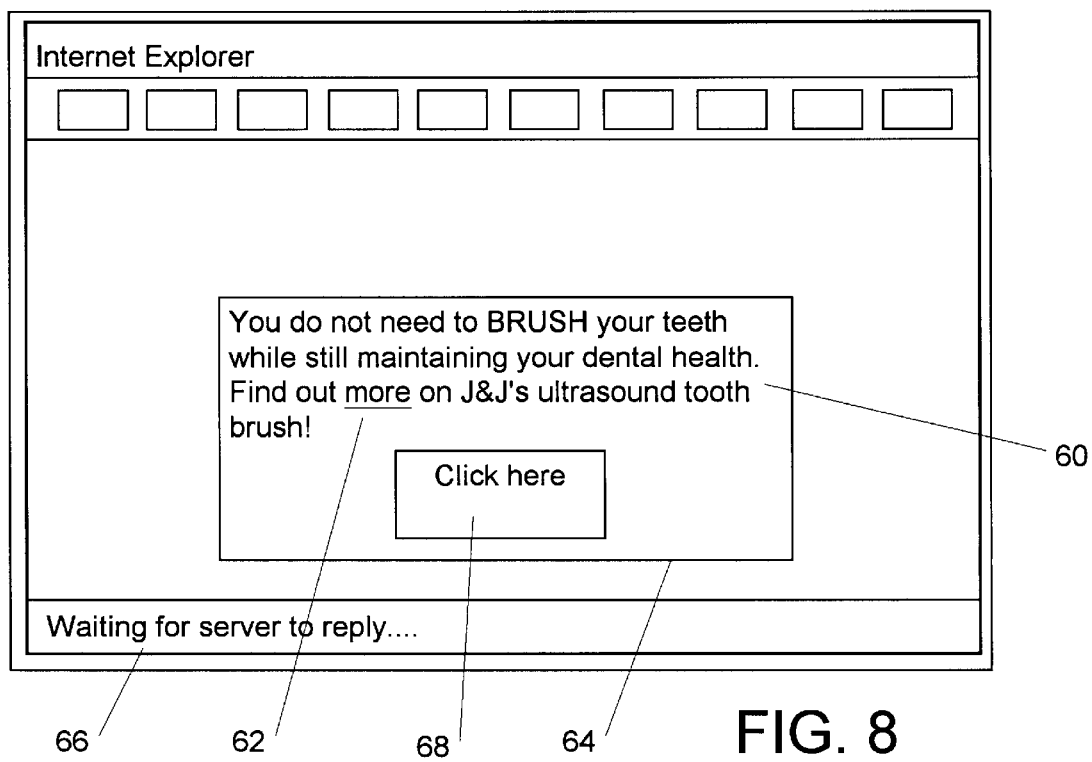
FIG. 8 is a screen display of a sample message window displayed while a computer using a mini-portal is waiting for a server to reply.

As described hereinabove, messages may be displayed during other idle times, so that the user may read messages while waiting for a server to respond, as shown in FIG. 8, or when the user becomes bored with reading the information in main browser window 66. Advantageously, since the messages are displayed during idle time, the user's attention will probably not be drawn away from the messages or advertisements by other web page content. Additionally, messages or advertisements displayed during idle time are unlikely to annoy users by preventing them from viewing other desired content.

Advantageously, message window 64, which is preferably a small browser window, only partially blocks main browser window 66, permitting the user to see the modem dialing status or server response status. By using message window 64 to display message 60, the user will understand that display of message 60 does not increase his or her modem connection time or server connection time. Additionally, message window 64 can simply be closed or placed behind main browser window 66 at the user's will. Since the message is displayed when the web page in which the user is interested is not yet available, the user will not be inconvenienced by the appearance of message window 64. This benefits both the user and the message owner, by making Internet browsing more productive and more time efficient, and by providing access to the user's display for advertisements.

In a preferred embodiment, message 60 may be written in HyperText Markup Language (HTML), Java enabled HTML format, or as a Visual Basic script. This permits message 60 to contain hyperlinks, such as link 62. Additionally, message 60 may be an animated message, or may be interactive. Interactive messages can, for example, be implemented in additional small pop-up windows (not shown).

If the user wishes to find out more about the message, he or she may click on hypertext link 62, or on graphic button 68. The additional information requested by the user may be displayed in main browser window 66, or in another browser window that may be opened to display the requested information.

It will be understood by one skilled in the relevant arts that although FIGS. 7 and 8 show visual messages, other types of messages may also be "displayed" by a preferred embodiment of the present invention. For example, the advertisements or other messages may comprise sound, video, animation, music, images, text, graphics, hyperlinks, interactive content, or any combination of these elements. Some of these elements may not require that any window be displayed. For example, if a message comprises only sound, the sound may be played without displaying a window over main browser window 66. Alternatively, the system may provide a small window permitting the playback of sound or other multimedia advertisements or messages to be controlled by the user.

Figure 9:
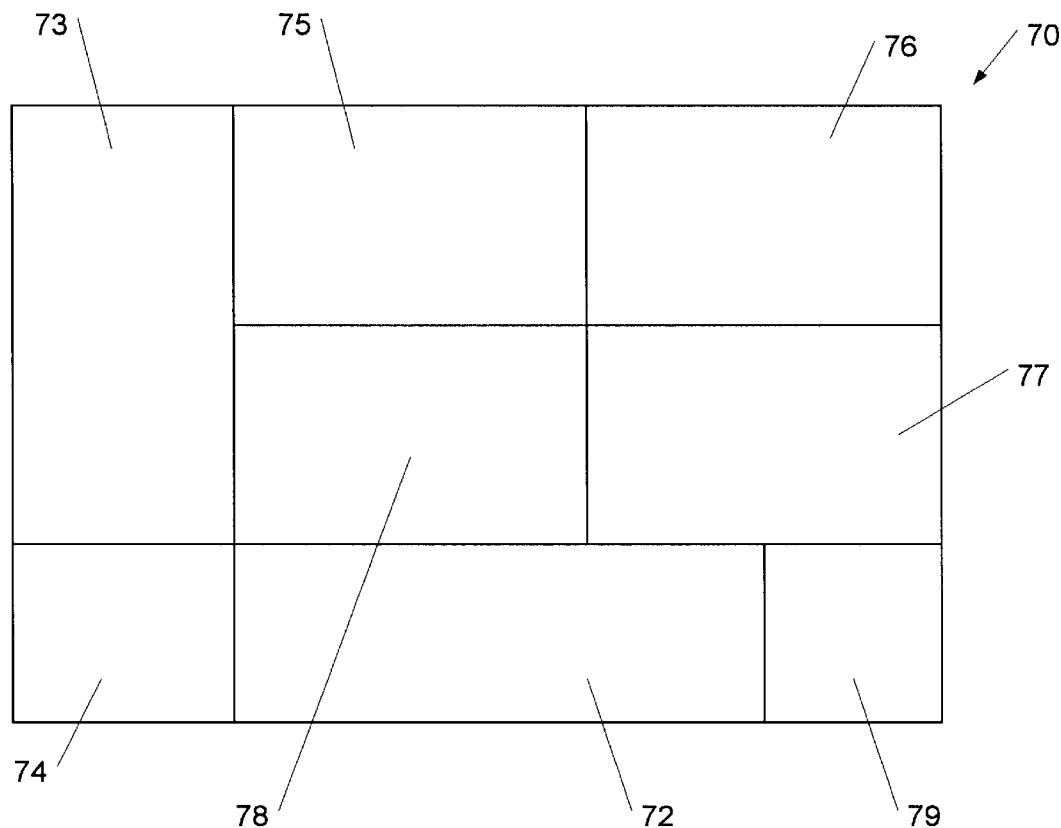
FIG. 9 is a screen display of a compound message window, having multiple frames, each of which contains a message.

As shown in FIG. 9, windows containing compound messages also may be displayed. Compound message window 70 comprises numerous frames, each of which contains a message. For example, frame 72 may contain a community announcement or local news story, provided for free by an ISP or by the portal provider. Frame 73 may contain announcements or advertising from the user's ISP, while frame 74 displays a logo for the ISP. Frames 75, 76, 77, and 78 may each contain advertisements, each from a different advertiser, and may each be controlled by a different entity. Thus, an ISP may have sold the space in frames 75 and 76, while the portal provider may have sold the space in frames 77 and 78. Finally, frame 79 may contain the logo for the portal provider.

The messages in each of these frames of compound message window 70 are all stored in non-volatile storage (either local, or on a proxy server computer), but may have been retrieved from multiple different sources. For example, the community announcement in frame 72 may have been retrieved from a local community message server, ISP, or portal provider, while the advertisement in frame 75 may have been retrieved from a commercial server.

VII. Mini-Portal Hardware

In a preferred embodiment of the system of the present invention, the mini-portal comprises both a hardware and a software component. In a preferred embodiment of the system of the present invention, in which the software portion of the mini-portal is implemented as part of a proxy server, the hardware portion of the mini-portal preferably comprises a plug-in card that combines a network interface, a modem, and a network hub. This mini-portal card permits a single server computer to provide an Internet connection to several computers on a LAN without requiring any additional hardware, aside from a network adapter in each of the client computers on the LAN. Advantageously, including a modem, a network interface, and a network hub on a single card permits a single configuration program to be used to set up the local area network and proxy server, thereby simplifying setup. Additionally, by including such a combination card as part of the mini-portal, the portal provider gives ISPs the opportunity to offer a complete networking and Internet access solution to their customers.

Figure 10:
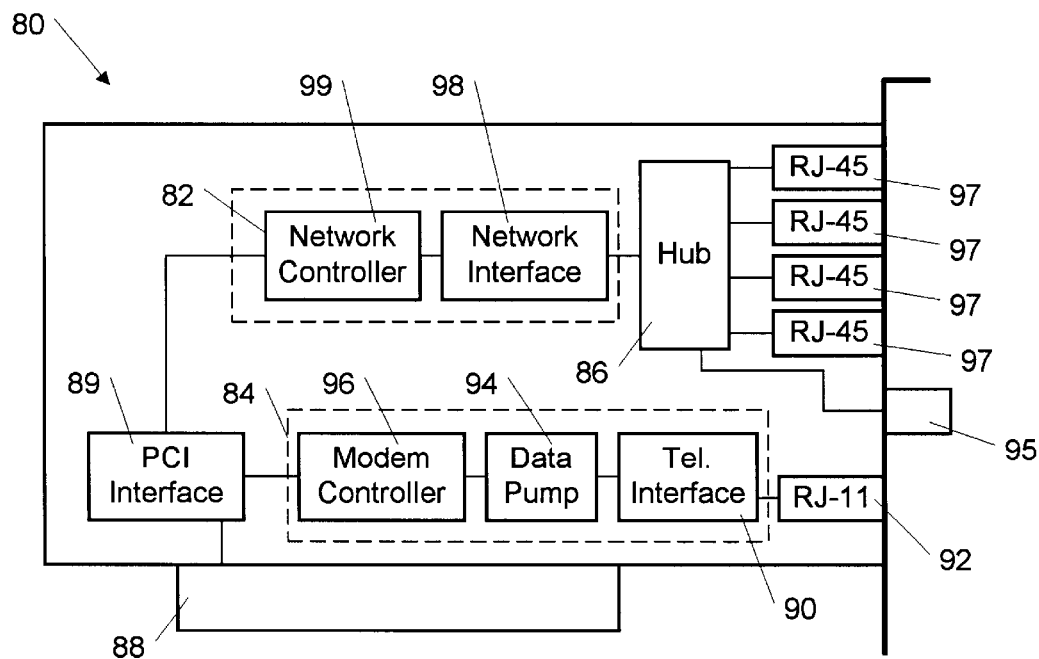
FIG. 10 is a block diagram of a communication card for use as a hardware portion of a mini-portal in a preferred embodiment of the present invention.

Referring now to FIG. 10, a block diagram of the mini-portal card that comprises the hardware portion of the preferred embodiment of the mini-portal of the present invention is described. Card 80 includes network interface controller circuitry 82, modem circuitry 84, and network hub circuitry 86. Card 80 also preferably includes PCI bus interface 88, and PCI interface circuitry 89, which permit the card to be plugged into the PCI bus of most standard PC compatible computers.

Modem circuitry 84 includes telephone interface circuitry 90, which interfaces modem circuitry 84 to a telephone line through connector 92, which preferably comprises a standard RJ-11 type modular telephone jack. Modem data pump circuitry 94 includes a digital telephone coder-decoder (CODEC) for communicating through telephone interface circuitry 90, and circuitry for performing a variety of functions such as modulation, demodulation, and echo cancellation on signals received through telephone interface circuitry 90. Modem circuitry 84 also includes modem controller 96, which controls modem data pump circuitry 94, and permits modem circuitry 84 to respond to standard modem commands, such as the "Hayes AT-command set", and to handle standard error control and data compression protocols, such as those described in International Telecommunication Union (ITU) recommendation V.42 or V.42bis. Modem circuitry 84 preferably conforms to the telecommunications specifications in ITU recommendations V.90, V.34, V.32bis, V.32, V.23, V.22bis, V.22, and V.21, permitting speeds up to 56,000 bits per second.

Optionally, modem circuitry 84 may be replicated one or more times, providing card 80 with the capability of connecting to more than one telephone line simultaneously. The additional modem circuitry may be used to permit card 80 to handle fax, voice mail, and other modem traffic through the additional modems, while one (or more) of the modems is providing a connection to the Internet through an ISP. Alternatively, the additional modem circuitry can be used to establish multiple simultaneous connections to the Internet through multiple accounts with an ISP, thereby increasing the bandwidth of the Internet access available to the computers on the LAN. When multiple modems are used to provide multiple connections to the Internet, the proxy server software of the mini-portal must be configured to split the Internet traffic between multiple Internet connections.

Network interface controller circuitry 82 preferably includes network interface circuitry 98, which connects network interface controller circuitry 82 to network hub circuitry 86, and network controller circuitry 99, which implements an appropriate network protocol. Network interface controller circuitry 82 preferably complies with the IEEE 802.3 standard, providing a 10BASE-T, 10 M bit per second Ethernet interface. A 100BASE-T or faster Ethernet interface also may be provided.

Network hub circuitry 86 is connected to network interface controller circuitry 82, and to a plurality of ports 97, which preferably comprise standard RJ-45 type modular jacks. Network hub circuitry 86 repeats any signal received from any of ports 97 or network interface controller circuitry 82 to all other of ports 97 and network interface controller circuitry 82. Network hub circuitry 86 also may be connected to optional cascade port 95, to permit an external network hub to be connected to card 80 to expand the capacity of the network.

The individual elements of circuitry 82, 84, 86, and 89 of card 80 may be constructed in accordance with previously known techniques. Thus, modem circuitry, network controller interface circuitry, network hub circuitry, and PCI interface circuitry are all per se known. Card 80 of the present invention combines all of these elements onto a single card thereby permitting a single configuration program to install these elements.

Card 80 is plugged into an appropriate slot within a host computer, preferably a "PC-compatible" personal computer. The host computer runs driver software which permits it to communicate with card 80, and network software, which permits modem circuitry 84 to be used to connect to the Internet, and network interface controller circuitry 82 and network hub circuitry 86 to be used to communicate with other computers and peripheral devices connected to card 80 through ports 97 and cascade port 95. Additionally, the host computer (i.e. the proxy server) runs proxy server software, including the above-described mini-portal software. The proxy server software permits multiple computers connected to card 80 through ports 97 and cascade port 95 to access the Internet using a single dial-up connection maintained by modem circuitry 84. The mini-portal software displays advertisements and other messages on a screen of the host computer, and on the screens of any client computers connected to card 80 through ports 97 and cascade port 95, in accordance with the principles of the present invention.

It will be understood one skilled in the art that numerous modifications could be made to card 80. For instance, modem circuitry 84 could be replaced with a telephone line interface, and the host computer could include a host signal processor (HSP) programmed as a soft modem. Alternatively, modem circuitry 84 could be replaced by ISDN modem circuitry, circuitry for interfacing with a digital subscriber line (DSL), or circuitry for interfacing with a cable Internet service. Similarly, PCI bus interface 88 and PCI interface circuitry 89 may be replaced with a bus interface and interface circuitry for connecting to some other standard bus, such as ISA or PCMCIA, which would also require that the form factor of the card be changed. Network interface controller circuitry 82 and hub circuitry 86 may optionally conform to networking standards other than IEEE 802.3 and 100BASE-T, such as ATM, FDDI, or home phoneline networking. Additionally, configurations with more or fewer ports connected to hub circuitry 86 than are shown may be produced.

Additionally, a processor may be added to card 80, along with software to handle some of the tasks of the mini-portal. For example, card 80 could be programmed to automatically check to see if the host computer is running the mini-portal software, and reinstall the mini-portal software on the host computer, disable the host computer's Internet connection, or report its findings if the mini-portal software has been disabled.

A processor on card 80 could also be programmed to automatically handle connecting with a server maintained by the portal provider to obtain validation stamps. Card 80 then could be programmed to disable itself if it does not receive a proper validation stamp.

Of course, use of the system described hereinabove does not require use of a combination mini-portal card, such as card 80. Any communication card, having circuitry that permits a host computer to connect with the Internet may be used in accordance with a less preferred embodiment of the present invention.

Although preferred illustrative embodiments of the present invention are described above, it will be evident to one skilled in the art that various changes and modifications may be made without departing from the invention. It is intended in the appended claims to cover all such changes and modifications that fall within the true spirit and scope of the invention.

What is claimed is:

1. A computer implemented method for providing a subsidized Internet connection to a user having a mini-portal comprising a communication device for connecting to the Internet and display software that causes advertisements to be displayed on a screen of an Internet access device, the display software displaying the advertisements stored on the Internet access device when a first idle condition is met, the display software downloading the advertisements over the Internet and storing the advertisements on the Internet access device when a second idle condition is met, the method comprising:

associating a unique identifier with the mini-portal;

sending the unique identifier over the Internet to a validation server, the validation server comprising a database that associates the unique identifier with a pointer to an advertising server, the validation server sending the pointer to the advertising server to the mini-portal;

using the pointer to the advertising server to connect to the advertising server over the Internet, the advertising server providing access to one or more advertisements;

identifying owners of the one or more advertisements;

calculating a fee for displaying the one or more advertisements to the user;

collecting the fee from the owners of the one or more advertisements; and using a portion of the fee to subsidize the Internet connection.

2. The method of claim 1, wherein using a portion of the fee to subsidize the Internet connection comprises using a portion of the fee to subsidize supplying the user with the mini-portal device.

3. The method of claim 1, wherein using a portion of the fee to subsidize the Internet connection comprises using a portion of the fee to subsidize access fees paid by the user to an Internet service provider.

4. The method of claim 1, wherein an Internet service provider sells advertisers an ability to provide content for the advertisements downloaded to the Internet access device through the mini-portal device.

5. The method of claim 4, wherein a portal provider supplies the user with the mini-portal device, and sells the Internet service provider an ability to provide content for the advertisements downloaded to the Internet access device through the mini-portal device.

6. The method of claim 4, wherein a portal provider sells the Internet service provider software that permits the Internet service provider to download the advertisements to the Internet access device through the mini-portal device.

7. The method of claim 4, wherein a portal provider retains an ability to provide content for a first set of advertisements downloaded to the Internet access device through the mini-portal device, and sells the Internet service provider an ability to provide content for a second set of advertisements downloaded to the Internet access device through the mini-portal device.

8. The method of claim 7, wherein the portal provider sells its ability to provide content for the first set of advertisements to one or more advertisers.

9. The method of claim 1, wherein a portal provider supplies the user with the mini-portal device, and sells advertisers an ability to provide content for the advertisements downloaded to the Internet access device through the mini-portal device.

10. The method of claim 1, wherein the first idle condition is selected from a group consisting of connecting to the Internet, waiting for a server to respond, and Internet browsing being idle for a period of time longer than a predetermined time limit.

11. The method of claim 1, wherein the second idle condition comprises usage of an Internet connection dropping below a predetermined threshold.

12. The method of claim 1, wherein the display software comprises software routines for displaying a message comprising a combination of one or more elements selected from a group consisting of sound, video, animation, music, images, graphics, text, hyperlinks, and interactive content.

13. The method of claim 1, wherein the mini-portal device comprises a communication device comprising modem circuitry, network interface circuitry, and hub circuitry.

14. The method of claim 1, further comprising verifying that a user does not disable the display software of the mini-portal device.

15. The method of claim 1, further comprising collecting information on how many times the advertisements are displayed by the display software.

16. The method of claim 1, further comprising using personal information supplied by the user to target the content provided by the advertisers to the user.

17. A method of providing advertisements over the Internet, the method comprising:

providing a user with a mini-portal device having a unique identifier, the mini-portal device comprising a communication device and display software that causes advertisements to be displayed on a screen of an Internet access device, the display software displaying advertisements stored on the Internet access device when a first idle condition is met, the display software downloading the advertisements over the Internet and storing the advertisements on the Internet access device when a second idle condition is met;

sending the unique identifier over the Internet to a validation server, the validation server comprising a database that associates the unique identifier with a pointer to an advertisement server, the validation server sending the pointer to the advertising server to the mini-portal;

using the pointer to the advertising server to connect to the advertising server over the Internet, the advertising server providing access to one or more advertisements;

calculating a fee for displaying the one or more advertisements to the user;

collecting the fee from the owners of the one or more advertisements;

using a portion of the fee to subsidize the Internet connection;

downloading the one or more advertisements; and storing the one or more advertisements on the Internet access device, so that they may be displayed by the display software.

18. The method of claim 17, further comprising associating validation information with the unique identifier, and sending a validation stamp including the validation information to the mini-portal.

19. The method of claim 18, wherein sending a validation stamp further comprises sending a validation stamp comprising a duration after which the validation stamp expires.

20. The method of claim 19, further comprising obtaining a new validation stamp for the mini-portal from the validation server when the validation stamp expires.

21. The method of claim 19, further comprising ceasing display of advertisements when the validation stamp expires.

22. The method of claim 19, further comprising disabling the mini-portal when the validation stamp expires.

23. The method of claim 17, further comprising sending an index file containing addresses of one or more content servers from the advertising server, and wherein downloading the one or more advertisements comprises contacting the one or more content servers and downloading one or more advertisements from each of the one or more content servers.

24. The method of claim 23, wherein sending the index file further comprises providing a set of parameters.

25. The method of claim 24, wherein providing a set of parameters comprises providing a set of parameters that includes an expiration time for the index file.

26. The method of claim 24, wherein providing a set of parameters comprises providing a set of parameters that includes one or more parameters for use by the display software, the one or more parameters affecting the first idle condition.

27. The method of claim 17, wherein providing a user with a mini-portal device comprises providing a mini-portal device in which the first idle condition is selected from a group consisting of connecting to the Internet, waiting for a server to respond, and Internet browsing being idle for a period of time longer than a predetermined time limit.

28. The method of claim 17, wherein providing a user with a mini-portal device comprises providing a mini-portal device in which the second idle condition comprises usage of an Internet connection dropping below a predetermined threshold.

29. The method of claim 17, wherein providing a user with a mini-portal device comprises providing display software that displays a message comprising a combination of one or more elements selected from a group consisting of sound, video, animation, music, images, graphics, text, hyperlinks, and interactive content.

30. The method of claim 17, wherein providing a user with a mini-portal device comprises providing a mini-portal device in which the communication device of the mini-portal comprises modem circuitry, network interface circuitry, and hub circuitry.

31. The method of claim 17, further comprising verifying that the display software is not disabled.

32. The method of claim 31, further comprising automatically reloading the display software if the display software is disabled.

33. The method of claim 17, further comprising collecting information on how many times each of the one or more advertisements have been displayed by the display software.

34. The method of claim 33, further comprising establishing a connection to a statistics server, and sending the information on how many times each of the one or more advertisements have been displayed by the display software to the statistics server.

35. A server that controls the access of one or more clients to advertising material, each of the one or more clients comprising a mini-portal device having a unique identifier, the mini-portal device comprising a communication device and display software that causes advertisements to be displayed on a screen of an Internet access device, the display software displaying advertisements stored on the Internet access device only when a first idle condition is met, the display software downloading the advertisements over the Internet and storing the advertisements on the Internet access device when a second idle condition is met, the server comprising:

a processor;

a communication device connecting the server to the Internet;

a storage device containing a database that associates the unique identifier of the mini-portal device with a pointer to an advertising server; and a memory, the memory comprising:

an initialization routine that accepts the unique identifier of the mini-portal over the Internet, and sends the pointer to the advertising server to the mini-portal.

36. The server of claim 35, wherein the database further associates validation information with the unique identifier of the mini-portal device, and wherein the memory further comprises a validation routine that sends a validation stamp including the validation information to the mini-portal.

37. An advertisement server, that sends pointers to advertisements to a mini-portal device, the mini-portal device comprising a communication device and display software that causes advertisements to be displayed on a screen of an Internet access device, the display software displaying advertisements stored on the Internet access device only when a first idle condition is met, the display software downloading the advertisements over the Internet and storing the advertisements on the Internet access device when a second idle condition is met, the advertisement server comprising:

a processor;

a communication device connecting the server to the Internet;

a storage device containing an index file, the index file comprising pointers to one or more content servers; and a memory, the memory comprising:

an advertisement routine that sends the index file to the mini-portal device in response to a request from the mini-portal device.

38. The advertisement server of claim 37, wherein the storage device further contains a parameter file, and the memory further comprises a parameter routine that sends the parameter file to the mini-portal device in response to a request from the mini-portal device.

39. The advertisement server of claim 38, wherein the parameter file contains parameters for use by the display software.

40. The advertisement server of claim 39, wherein the parameters affect the first idle condition.

* * * * *